D. F. COMSTOCK.
AUXILIARY REGISTERING DEVICE FOR SIMULTANEOUS PROJECTION OF TWO OR MORE PICTURES.
APPLICATION FILED FEB. 16, 1916.
1,208,490.
Patented Dec. 12, 1916.
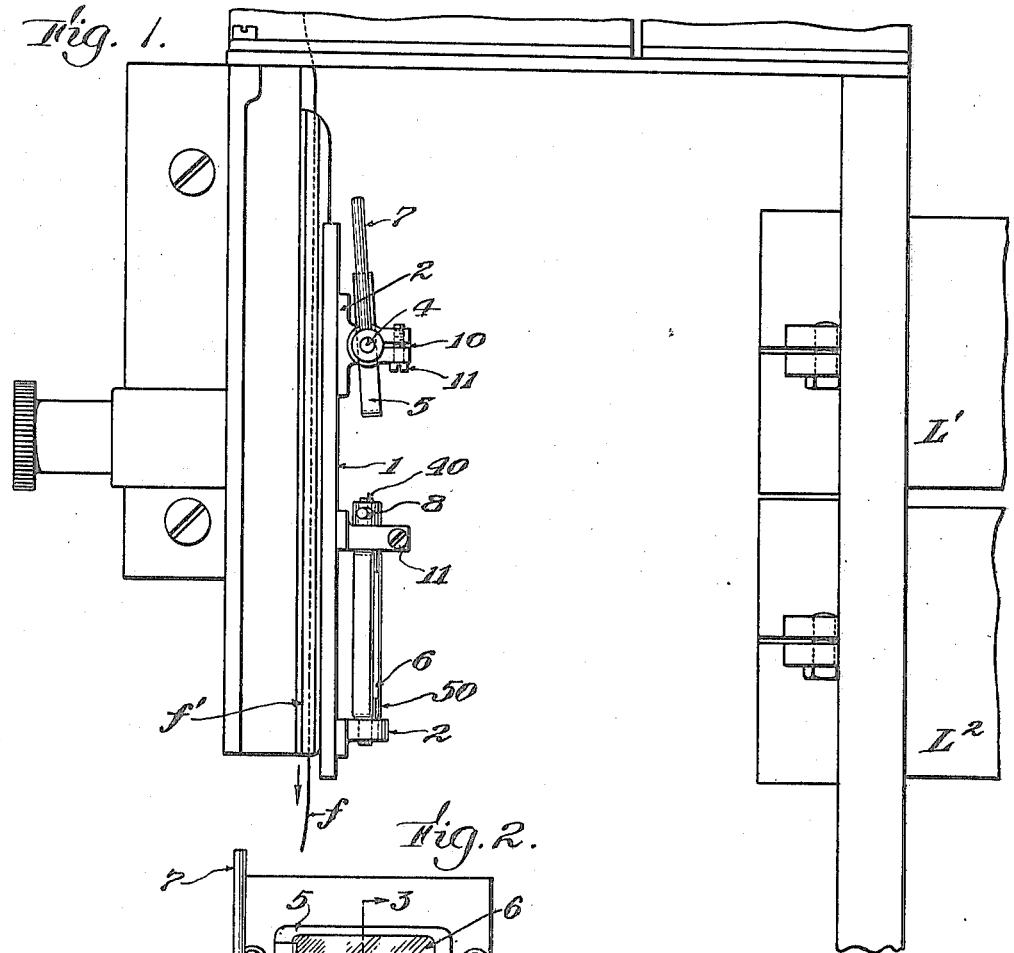
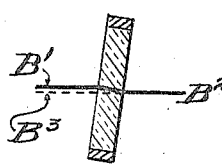
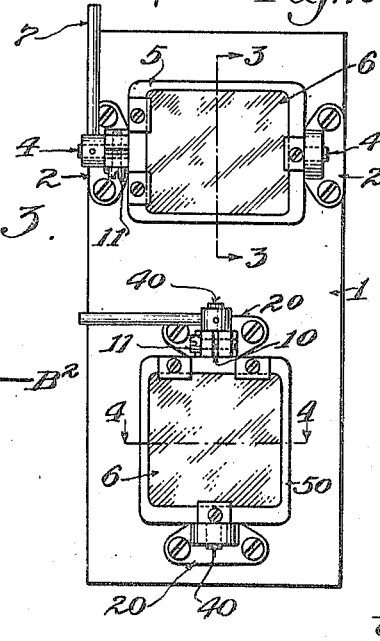
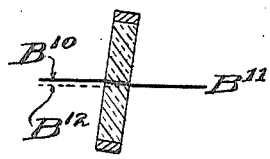
Inventor:
Daniel F. Comstock,
by Roberts, Roberts & Cushman,
his Attorneys.

UNITED STATES PATENT OFFICE.

DANIEL F. COMSTOCK, OF BROOKLINE, MASSACHUSETTS, ASSIGNOR, BY MESNE ASSIGN-
MENTS, TO TECHNICOLOR MOTION PICTURE CORPORATION, OF BOSTON, MASSACHU-
SETTS, A CORPORATION OF MAINE.

AUXILIARY REGISTERING DEVICE FOR SIMULTANEOUS PROJECTION OF TWO OR MORE PICTURES.

1,208,490.            Specification of Letters Patent.      Patented Dec. 12, 1916.

Application filed February 16, 1916. Serial No. 78,754.

*To all whom it may concern:*

Be it known that I, DANIEL F. COMSTOCK, a citizen of the United States, and resident of Brookline, in the county of Norfolk and State of Massachusetts, have invented new and useful Improvements in Auxiliary Registering Devices for Simultaneous Projection of Two or More Pictures, of which the following is a specification.

My invention relates to an auxiliary registering device for optically adjusting the position with respect to the remainder of an optical system otherwise remaining fixed of two or more like or simultaneous image-carrying beams of light.

One object of my invention is to provide in connection with a projection apparatus adapted for the simultaneous projection of two or more pictures, means for readily displacing one or more of the virtual objects forming the object of the projection lens or lenses.

A further object is to provide means for the above purposes adapted for use with cinematographic apparatus capable of multi-color projection, whereby the screen images of a plurality of different colors may be moved with respect to each other, by means capable of delicate and accurate results.

In the accompanying drawings, Figure 1 is a side elevation of a projection lantern illustrating one form of my device; Fig. 2 is a front elevation of the refracting plates; Figs. 3 and 4 are diagrams illustrating the effect upon the light passing through them of the respective plates, Fig. 3 being a section on line 3—3 Fig. 2, and Fig. 4 being a section on line 4—4 of Fig. 2.

When it is attempted to project in registry a number of mutually supplemental pictures, as in light of a plurality of colors, for instance of two different colors to obtain the effect of natural colors by the addition together or registering of the two or more component differently colored images on a distant screen, a prime essential of success is accuracy in the registry of the component images at the screen. For motion picture display a colored screen image in the sense referred to may be composed either of simultaneously displayed components or components successively displayed with a lapse of time between so short as to cause visual fusion, and my device is equally of use for bringing into registry the components of a composite image, whether its components are of different colors or of different forms, as may occur when the screen picture is of two or more mutually supplemental components of the same or different colors.

When it is attempted to display a series of such composite or additive pictures in succession for motion picture production, the procurement of the necessary accuracy of registry is made difficult by the practical necessity of projected images from a flexible film, upon which the pictures forming the object to be projected are photographed in a relation to each other subject to variation owing to shrinkage, temperature changes and other causes.

Referring now to Fig. 1, on a plate 1 fixed in front of the lamp house (not shown) and the ordinary or any object positioning means such as a suitable film gate $f'$ for a film $f$ of a motion picture projector, said plate and gate having openings therein for a plurality, (shown as two) of beams of light, I provide bearings 2, 20, respectively for pintles, 4, 40 of frames 5, 50 each carrying a plane parallel piece of glass 6, in front of each opening of the film gate and in each beam of light.

The direction of the axis 4 of one plate 6 is at right angles to the direction of the axis 40 of the other plate 6. Handles 7 and 8 fast respectively to the pintles 4 and 40 project at one side in convenient reach of the operator. One each of the bearings 2 and 40 is split, as at 10, and provided with a pinch-screw 11, so that the respective frames 5 and 50 are frictionally held in any tilted position to which they may be adjusted.

While I prefer the specific adjustment devices shown, it will be obvious that any substitute mounting for the plates 6 permitting them to be tilted with respect to light passing through them may be employed.

The projector is further provided with usual lenses $L'$, $L^2$ which are axially fixed.

Upon tilting either plate 6 the beam passing therethrough is refracted at the entering face and again at the exit face of the plane parallel plate, so that the entering and emergent rays are parallel, but the emergent ray is displaced in the direction of rotation of the plate 6 by an amount dependent upon the angle of refraction with respect to the planes of the surfaces of the plate 6, and upon the thickness of the plate. This displacement is quantitatively minute compared with the angle of rotation. This will be evident from Figs. 3 and 4. If B' is a line central of and representative of the upper beam of light, and the line of sight of lens L' when the frame 5 and plate 6 are tilted about the horizontal as shown the actual position of the line B' is along the bent path B', B² as shown, the virtual position of the center point of the object transfixed by B' now being in an extension of the emergent path B², as shown at B³. What is true of the center line B' is true of every point of the film exposed behind the tilted path, and it will be observed that the effect of tilting the frame S forward is to shorten the vertical distance separating like points of two film pictures by the distance between B' and B³, or conversely, the effect is equivalent to shifting the axis of lens L' vertically.

Fig. 4 illustrates the similar effect in another dimension of the lower plate 6 when tilted about axis 40. The line of sight $B^{11}$ of lens $L^2$ coincides with a new virtual position of the object $f$ lying on the line $B^{12}$, which is laterally deflected by the distance between $B^{10}$ and $B^{12}$. By moving one or the other of the plates, images out of registry by reason of the direction and distance of the axes of lenses L, may be brought accurately into registry.

It will be obvious that one or more of the plates 6 may be mounted to move in two dimensions if desired, but for the fine adjustment for minute errors of shrinkage, expansion or lateral displacement of one film picture with respect to another, I prefer the arrangement shown, which is effective and reliable.

It should be noticed that by the use of my device I avoid the mechanical displacement of the lenses which it is most difficult to perform accurately and impossible to perform quickly enough for my purposes.

If desired the plates 6 may constitute or carry the color-absorption screens for projecting the pictures in different component colors.

What I claim is:

1. A projection apparatus having in combination object positioning means, a projection lens and movable refractive means adapted in different positions to change the virtual position of the object whose image is projected.

2. Projection apparatus having therein object positioning means, and means for changing the virtual direction of an object positioned thereby with respect to a lens for projecting an image of said object comprising a transparent refracting body interposed between said object and said lens, and means whereby said refracting body may be tilted with respect to the direction from said lens to a point of said object.

3. Means for bringing into registry the images of a plurality of objects slightly displaced respectively with reference to the axes of a similar plurality of projection lenses, comprising transparent refracting bodies interposed between each object and one lens, and means whereby said bodies may be tilted in different directions mutually to displace the virtual position of the different objects in different directions.

4. A projection apparatus having in combination lenses, positioning means for objects to be projected, and refracting means between each lens and said positioning means adapted to be adjusted independently to vary the virtual direction of the object from the lens.

5. Projection apparatus having a filmgate providing a plurality of display-openings, axially fixed projection lenses, one for each opening, and means for making a fine adjustment of the positions of the images projected by the several lenses comprising a plane parallel refracting plate adjustably mounted for rotation about an axis crosswise of the line of sight from lens to display opening.

6. An auxiliary registering device for an optical projector having optical systems for the simultaneous projection of two or more pictures, comprising a plane parallel refracting transparent plate and a mounting therefor permitting said plate to be moved into and held in a position tilted with respect to the optical axis of one of said optical systems.

7. An auxiliary registering device for optical projectors adapted to be placed between the projection lenses and the film or other object to be projected comprising a plurality of similar plane parallel transparent reflecting plates and a mounting for each plate having a frame, axial pivots therefor substantially parallel with the surfaces of said plates, and a friction bearing for one or more of said pivots, the pivotal axis for one plate being at an angle to that for another plate.

Signed by me at Boston, Massachusetts, this 28th day of January, 1916.

DANIEL F. COMSTOCK.